| United States Patent [19] | [11] Patent Number: 5,041,958 |
| --- | --- |
| Dhyanchand et al. | [45] Date of Patent: Aug. 20, 1991 |

[54] STEPPED-WAVEFORM INVERTER WITH FOUR SUBINVERTERS

[75] Inventors: P. John Dhyanchand; Sunil Patel; Chai-nam Ng; Vietson Nguyen, all of Rockford, Ill.

[73] Assignee: Sundstrand Corporation, Rockford, Ill.

[21] Appl. No.: 454,433

[22] Filed: Dec. 20, 1989

[51] Int. Cl.$^5$ ..................... H02M 1/12; H02M 5/458
[52] U.S. Cl. .......................................... 363/43; 363/71
[58] Field of Search .............................. 363/43, 71, 72

[56] References Cited

U.S. PATENT DOCUMENTS 3,609,507 9/1971 Beck ................................. 363/71 X
4,032,832 6/1977 Miller ..................................... 363/43

Primary Examiner—Steven L. Stephan
Assistant Examiner—Emanuel Todd Voeltz
Attorney, Agent, or Firm—Marshall, O'Toole, Gerstein, Murray & Bicknell

[57] ABSTRACT

An inverter for use in a power conversion system of the type used in an aircraft, for example, includes a first subinverter pair that generates a first pair of waveforms and a second subinverter pair that generates a second pair of waveforms. The two subinverter pairs are connected to a summing transformer having two pairs of primary windings and a plurality of secondary windings coupled to the primary windings. A regulator is coupled to the output of the summing transformer and varies the phase angles between the waveforms generated by the two subinverter pairs based upon the voltage and current at the output of the summing transformer in order to regulate the voltage at the output of the summing transformer.

6 Claims, 11 Drawing Sheets

STEPPED-WAVEFORM INVERTER WITH FOUR SUBINVERTERS

TECHNICAL FIELD

The present invention relates to a power conversion system, and more particularly to an inverter for a power conversion system.

BACKGROUND ART

Power conversion systems, such as variable-speed, constant-frequency (VSCF) power conversion systems, are commonly used in aircraft and aerospace applications to generate AC and DC power from a prime mover, such as a jet engine. In such an application, variable-frequency AC power may be produced by a brushless, synchronous generator driven by the jet engine. The variable-frequency AC power is converted to DC power by an AC/DC converter, such as a rectifier bridge. An inverter is coupled to the AC/DC converter to transform the DC power into constant-frequency AC power, which is then filtered by a filter. The filtered AC output is then provided to an AC load bus which supplies power to various points throughout the aircraft.

The inverter used in VSCF systems may be of the stepped-waveform type. An inverter of this type is disclosed in U.S. Pat. No. 3,775,662 to Compoly, et al. Such a stepped-waveform inverter generates an output having a stepped shape that generally approximates a sine wave. The purpose of approximating a sine wave is to reduce the size of the filters, provided at the output of the inverter, that are used to remove unwanted harmonics. While previous stepped-waveform inverters may accomplish such goals, efficient and effective methods of control of such inverters have heretofore been lacking.

SUMMARY OF THE INVENTION

The present invention is directed to an inverter for use in a power conversion system. The inverter converts DC power into constant-frequency AC power. The inverter includes a summing transformer and is responsive to the AC power generated by the power conversion system. The inverter regulates the AC power by controlling a phase angle between the waveforms produced by a number of subinverters of the inverter.

In one aspect, the invention is directed to an inverter for use in a power conversion system that produces an AC output. The inverter has a summing transformer that includes four three-phase transformers. The transformers are grouped into two subgroups. Each subgroup consists of two subinverters and two three-phase transformers. One of the two three-phase transformers in each subgroup has star-connected primary windings and the other three-phase transformer has delta-connected primary windings. The transformers have secondary windings coupled to the primary windings.

A first subinverter generates a first waveform in a first transformer, and a second subinverter generates a second waveform in a second transformer. A regulator circuit is coupled to sense the current and voltage of the AC output. The regulator circuit varies the phase angle between the first and second waveforms based upon both the magnitude of the voltage sensed at the AC output and the current sensed at the AC output.

In another aspect, the invention is directed to an inverter having a regulator circuit that controls the voltage at the AC output to a first predetermined magnitude when the current sensed at the AC output is less than a second predetermined magnitude. The regulator circuit controls the voltage at the AC output to less than the first predetermined magnitude when the current sensed at the AC output is more than the second predetermined magnitude.

These and other aspects, features, and advantages of the present invention will be apparent to those of ordinary skill in the art in view of the detailed description of the preferred embodiments, which is made with reference to the drawings, a brief description of which is provided below.

DESCRIPTION OF THE PREFERRED EMBODIMENT

Figure 1:
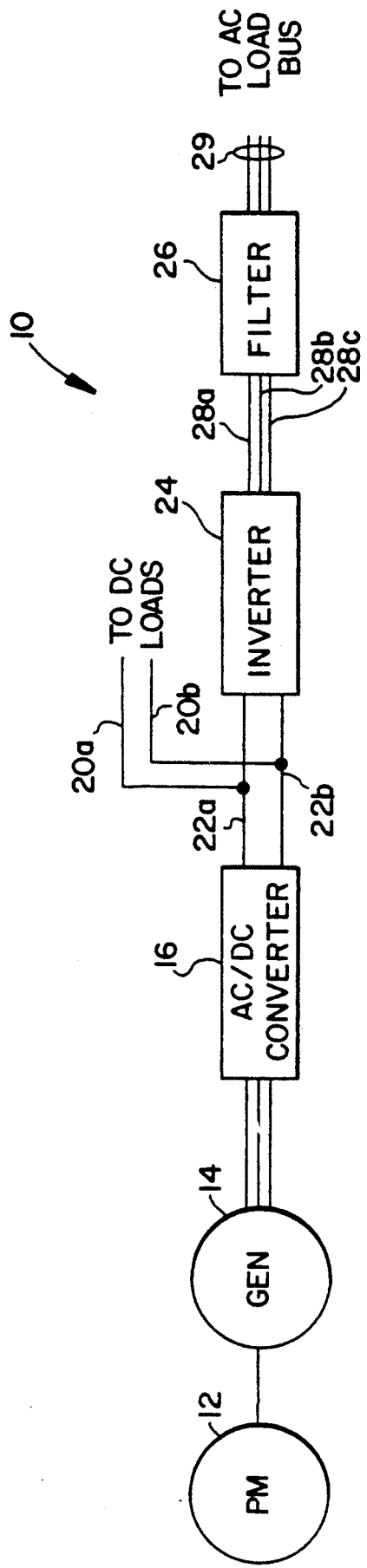
FIG. 1 is a block diagram of a VSCF power generation system for generating AC and DC power from a prime mover.

A block diagram of a preferred embodiment of a VSCF power conversion system 10 incorporating the present invention is shown in FIG. 1. The VSCF system 10 includes a prime mover 12 coupled to a generator 14 for generating variable-frequency AC power. An AC/DC converter 16 is coupled to the generator 14 for converting the variable-frequency AC power into DC power. The DC output of the AC/DC converter 16 is supplied to various DC loads in the aircraft via a pair of lines 20a, 20b. A second pair of lines 22a, 22b provides the DC output to an inverter 24, which generates three-phase, constant-frequency AC power from the DC output of the converter 16. The inverter 24 is coupled to a filter 26 via three output lines 28a, 28b, 28c, each of which supplies a respective phase of the constant-frequency AC output to the filter 26. The output of the filter 26 is provided via lines 29 to a three-phase AC load bus which supplies AC power to various AC loads in the aircraft.

Figure 2:
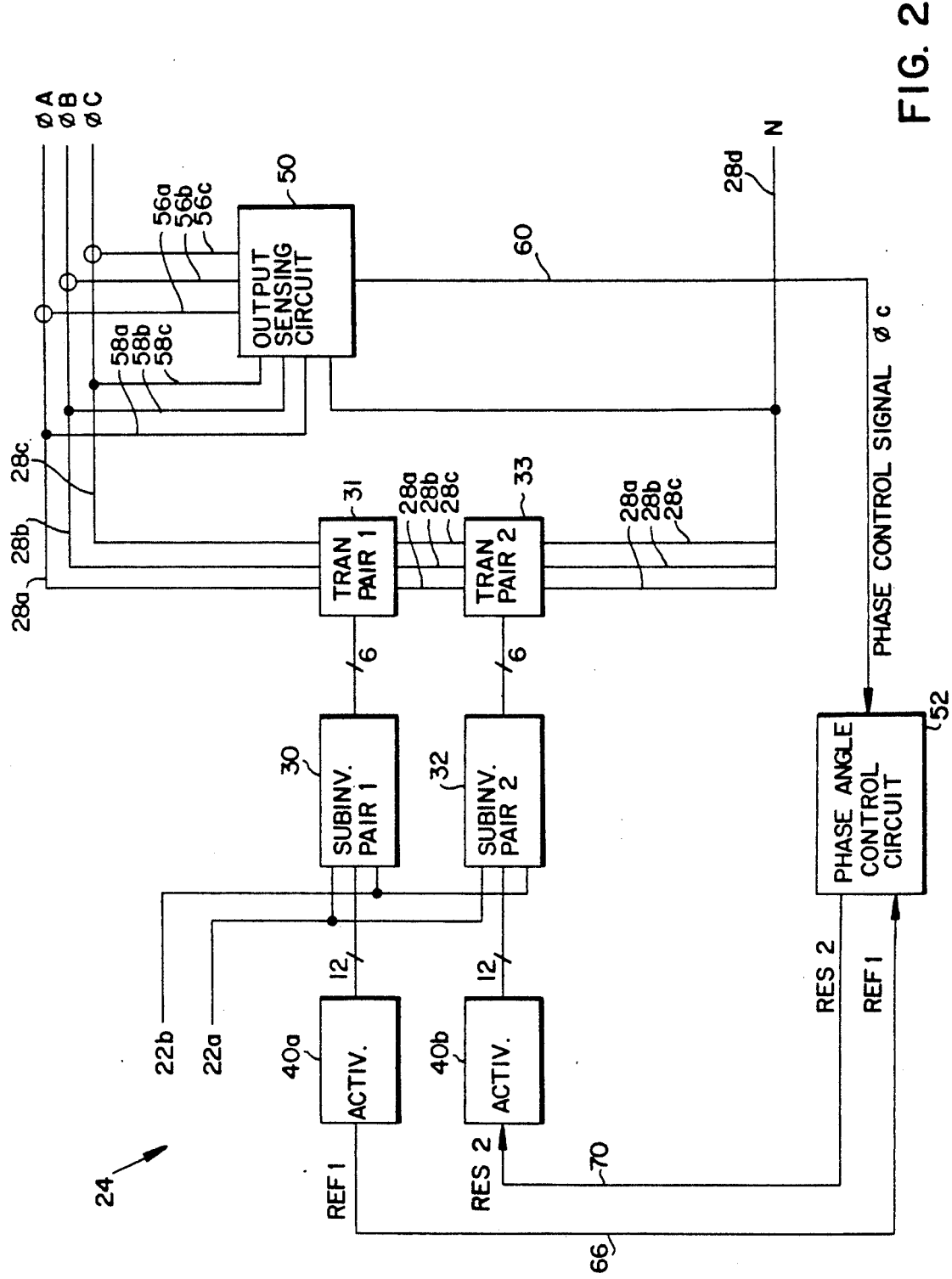
FIG. 2 is a block diagram of the inverter of FIG. 1.

A block diagram of the inverter 24 is shown in FIG. 2. The inverter 24 includes two subinverter pairs 30, 32. Each of the subinverter pairs 30, 32 is coupled to a respective transformer pair 31, 33. The output lines 28a, 28b, 28c interconnect the transformer pairs, and the transformer pair 33 is connected to a neutral line 28d. Each of the subinverter pairs 30, 32 is controlled by a respective activation circuit 40a, 40b.

A regulator circuit for regulating the voltage on the transformer output lines 28a, 28b, 28c is shown in FIG. 2 to comprise an output sensing circuit 50 and a phase angle control circuit 52. The output sensing circuit 50 senses the current on the three transformer output lines 28a, 28b, 28c via three lines 56a, 56b, 56c, and the sensing circuit 50 senses the voltage on the three output lines 28a, 28b, 28c via three lines 58a, 58b, 58c. The output sensing circuit 50 generates a phase control signal, $\Phi_c$, having a magnitude based on both the voltage and current sensed on the lines 28a-c and provides the $\Phi_c$ signal to the phase control circuit 52 via a line 60. Based on the magnitude of the $\Phi_c$ signal, the phase angle control circuit 52 causes the phase angle between the waveforms generated by the first subinverter pair 30 and the second subinverter pair 32 to be varied. As a result of the control of the phase angle, the voltage on the transformer output lines 28a, 28b, 28c is regulated.

Alternatively, instead of sensing the AC output on the lines 28a-c, the regulator circuit 50 could sense the AC output on the lines 29 after the AC output is filtered by the filter 26.

The phase angle control circuit 52 varies the magnitude of the phase angle by generating a reset signal, RES2, based upon the magnitude of the phase control signal $\Phi_c$ and a reference signal, REF1. The REF1 signal is transmitted to the phase angle control circuit 52 from the activation circuit 40a via a line 66. The RES2 signal is transmitted from the phase angle control circuit 52 to the activation circuit 40b via a line 70. As described in more detail below, the RES2 signal controls the phase angle between the waveforms generated by the first subinverter pair 30 and the waveforms generated by the second subinverter pair 32.

Figure 3:
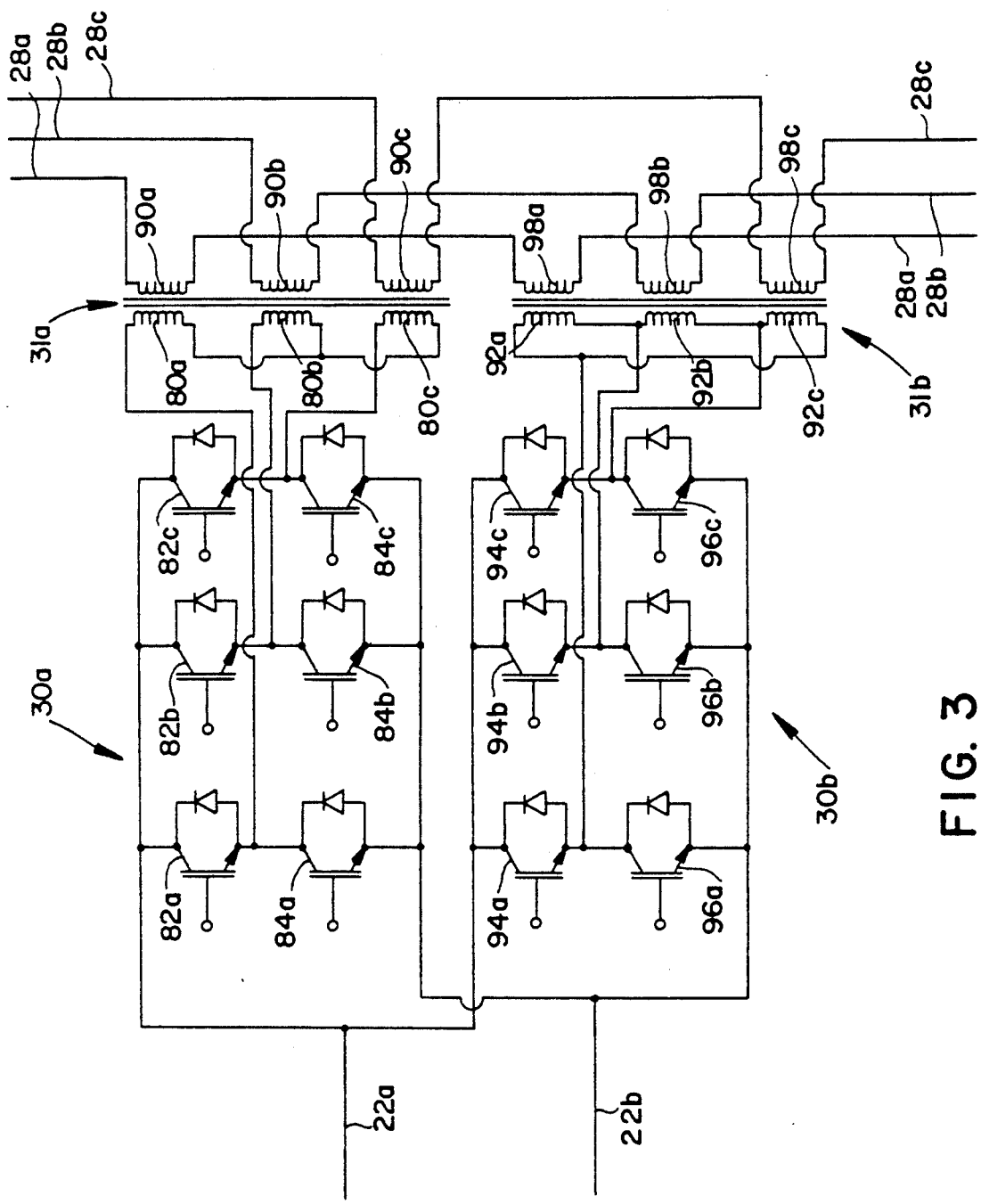
FIG. 3 is a circuit diagram of one pair of subinverters and their associated transformers of the inverter of FIG. 2.

The first subinverter pair 30 and the first transformer pair 31 are shown in FIG. 3. The first subinverter pair 30 includes two subinverters 30a, 30b, and the first transformer pair 31 includes two three-phase transformers 31a, 31b.

The subinverter 30a includes six transistor switches 82a, 82b, 82c, 84a, 84b, 84c, each of which has a diode connected across it. The subinverter 30a is connected to three star- or wye-connected primary windings 80a, 80b, 80c of the transformer 31a which are controlled by the three pairs of switches 82a-c, 84a-c. The upper terminal of the winding 80a is connected to the junction of the switches 82a, 84a; the upper terminal of the winding 80b is connected to the junction of the switches 82b, 84b; and the upper terminal of the winding 80c is connected to the junction of the switches 82c, 84c. The primary windings 80a-c of the transformer 31a are coupled to three secondary windings 90a-c, respectively.

During operation of the subinverter 30a, exactly one of the two switches in each vertical branch is conducting. In particular, one of the two switches 82a, 84a is conducting and the other is off; one of the switches 82b, 84b is conducting and the other is off; and one of the switches 82c, 84c is conducting and the other is off. The switches 82a-c and 84a-c are switched in a conventional manner to generate the waveform 220 in FIG. 5 on each of the three wye-connected windings 80a, 80b, 80c, each of the three waveforms 220 differing in phase by 120°. Because the windings 80a-c are wye-connected, the waveform 220 has five possible amplitudes at any point in time, +A, +A/2, 0, −A/2, and −A, where A is the maximum amplitude.

The subinverter 30b includes six transistor switches 94a, 94b, 94c, 96a, 96b, 96c, each of which has a diode connected across it. The subinverter 30b is connected to three delta-connected primary windings 92a, 92b, 92c of the transformer 31b which are controlled by the three pairs of switches 94a-c, 96a-c. The upper terminal of the winding 92a is connected to the junction of the switches 94a, 96a; the upper terminal of the winding 92b is connected to the junction of the switches 94b, 96b; and the upper terminal of the winding 92c is connected to the junction of the switches 94c, 96c. The three delta-connected primary windings 92a-c are coupled to three secondary windings 98a-c of the transformer 31b, respectively.

Figure 5:
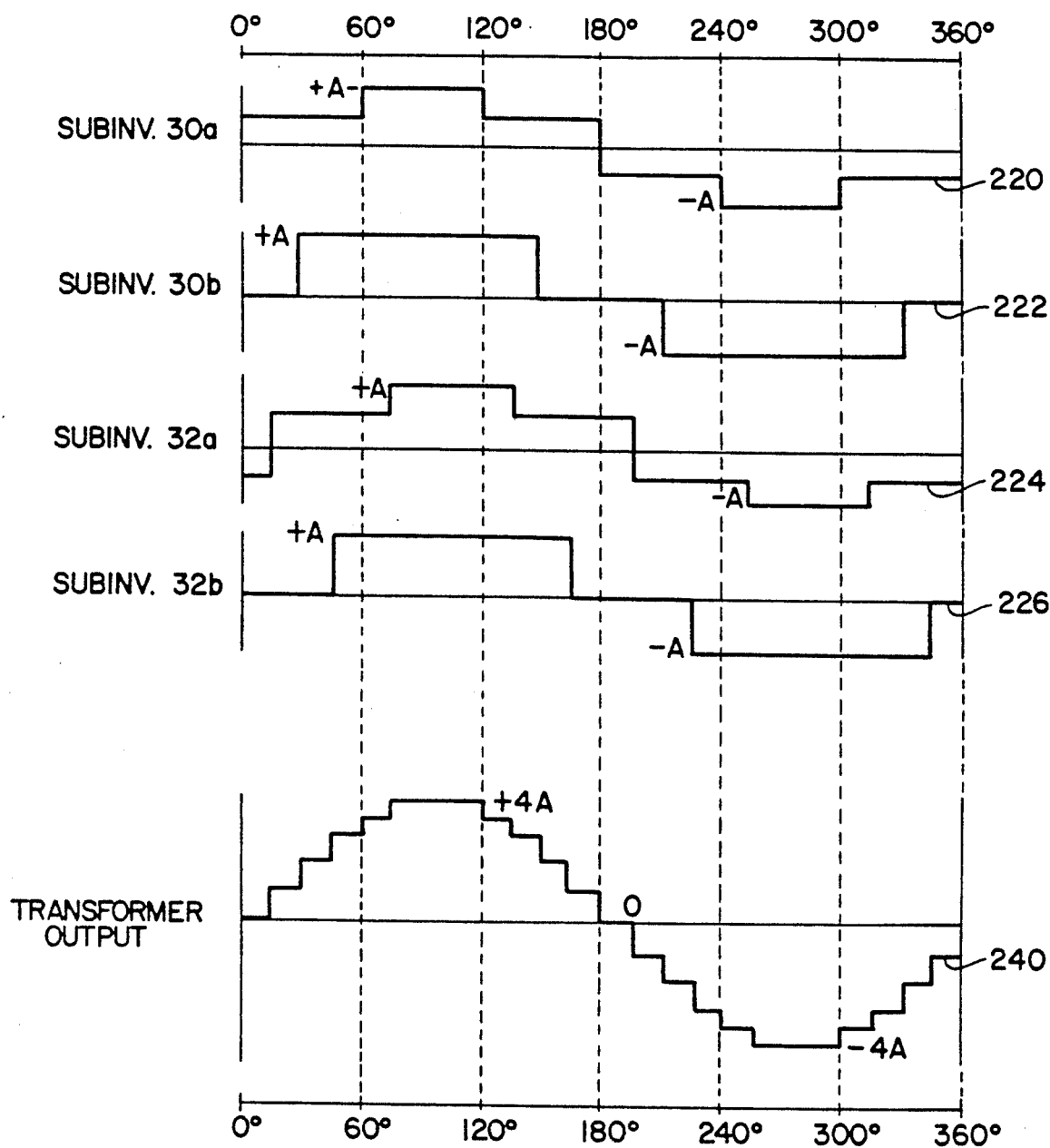
FIG. 5 illustrates a first phase relationship of a number of waveforms generated by the inverter and a waveform produced by the summation of those waveforms.

The switches 94a-c and 96a-c are switched in a manner similar to switches 82a-c and 84a-c to generate the waveform 222 in FIG. 5 on each of the three delta-connected windings 92a, 92b, 92c, each of the three waveforms 222 having a phase difference of 120°. Because the windings are delta-connected, such a waveform has three possible amplitudes, +A, 0, and −A, where A is the maximum amplitude.

While the switches 82a-c, 84a-c, 94a-c, 96a-c are shown to be transistors, other types of switches may be used, such as thyristors or Dailngton-connected transistor pairs.

The circuit diagram for the second subinverter pair 32 and the second transformer pair 33 is identical to the one shown in FIG. 3 and is not shown separately for purposes of simplicity.

Figure 4:
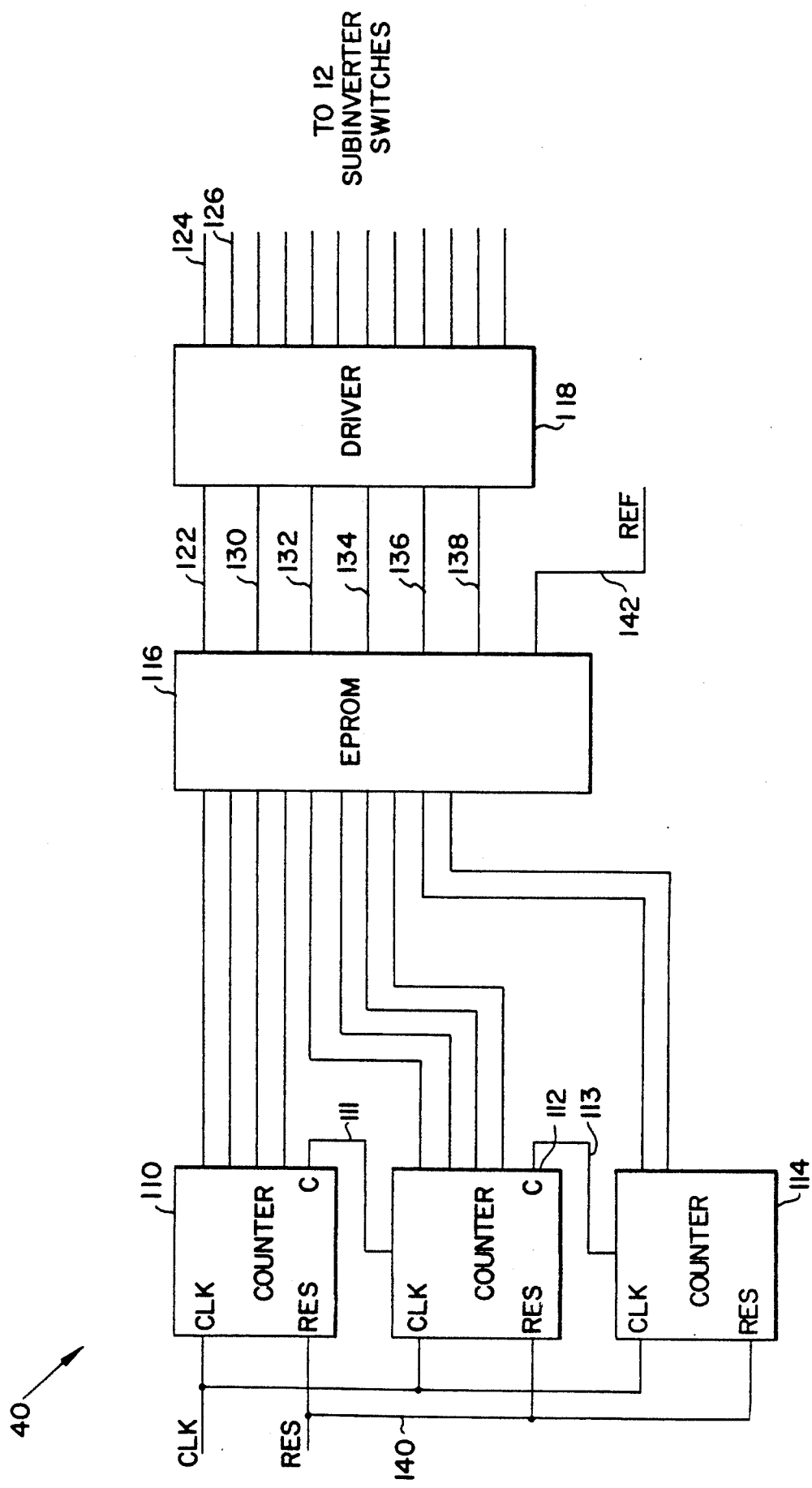
FIG. 4 is a circuit diagram of one of the activation circuits of FIG. 2.

The activation of the twelve switches 82a-c, 84a-c, 94a-c, 96a-c in each of the subinverter pairs is controlled by a respective one of the activation circuits 40a, 40b. Since the two activation circuits are substantially identical, only one is shown. Referring to FIG. 4, the activation circuit 40 includes three four-bit counters 110, 112, 114 connected to an EPROM 116 connected to a driver circuit 118. The counters 110, 112, 114 are driven by a clock signal, CLK, generated by a main controller (not shown). The carry output of the counter 110 is input to the counter 112 via a line 111, and the carry output of the counter 112 is input to the counter 114 via a line 113. Upon each pulse of the CLK signal, the 10-bit output of the counters 110, 112, 114 is incremented by one. This 10-bit output is used as an address to address the EPROM 116.

The EPROM 116 has a six-bit binary code stored in each of its address locations. The six binary bits control the activation of the 12 switches in one of the subinverters. In particular, one bit of the six-bit binary code is output on the line 122 to the driver 118, which generates an uncomplemented switching signal on a line 124 and a complemented switching signal on a line 126. The line 124 is connected to the base of one switch in one vertical branch of one of the subinverters, such as switch 82a, and the line 126 is connected to the base of the other switch in the vertical branch, such as switch 84a.

The remaining five bits of the six-bit binary code are output on the lines 130, 132, 134, 136, 138, respectively, to the driver circuit 118, which generates on its outputs a pair of complemented driving signals for each of the five binary signals. These driving signals are supplied to the remaining switches of the subinverter.

During operation of the activation circuit 40, as the CLK signal supplied to the counters 110, 112, 114 is periodically incremented, the six bits of the binary code are periodically output from the EPROM 116 via lines 122, 130–138 to the driver 118, and the 12 switches of each of the subinverters 30a, 30b, 32a, 32b are controlled to generate the waveforms 220, 222, 224, 226 shown in FIG. 5 in the primary windings in each of the transformers 31a, 31b, 33a, 33b, respectively.

The EPROM 116 generates a reference signal, REF, on a line 142. As described in more detail below, the REF signal is used as a phase reference signal.

A reset signal, RES, may be input to the counters 110, 112, 114 via a line 140. When the RES signal is activated, the counters 110, 112, 114 are reset, thus providing a 10-bit address to the EPROM 116 equal to zero. The contents of each EPROM in the two activation circuits 40a, 40b are identical. If each of the EPROMs is given the same sequence of addresses, the resulting waveforms generated by the subinverters would be identical and thus have zero phase angle. Accordingly, the time of reset of the counters 110, 112, 114 of one activation circuit determines the phase angle between the waveforms generated by that activation circuit and the waveforms generated by the other activation circuit.

When the activation circuit 40 of FIG. 4 is used for the activation circuit 40a shown in FIG. 2, the REF line 142 of FIG. 4 is connected to the REF1 line 66 of FIG. 2, and the RES line 140 of FIG. 4 is not used. When the activation circuit 40 of FIG. 4 is used for the activation circuit 40b, the RES line 140 of FIG. 4 is connected to the RES2 line 70 of FIG. 2, and the REF line 142 of FIG. 4 is not used.

Stepped-waveform inverters having four subinverters as shown in FIG. 2 are referred to as 24-step inverters.

Referring to FIG. 5, the waveforms generated by the subinverters 30a, 30b, 32a, 32b in the primary windings of the transformers 31a, 31b, 33a, 33b are shown. The summing transformer output waveform 240 shown in the bottom portion of FIG. 5 is generated on each of the three transformer output lines 28a, 28b, 28c, each of the three waveforms 240 being 120° apart. The waveform 240 represents the summation of the waveforms 220, 222, 224, and 226.

In the operation of the inverter, the phase angle between the waveforms generated by the first subinverter pair 30 and the waveforms generated by the second subinverter pair 32 is varied, depending upon the output voltage sensed on the transformer output lines 28a–c.

Figure 6:
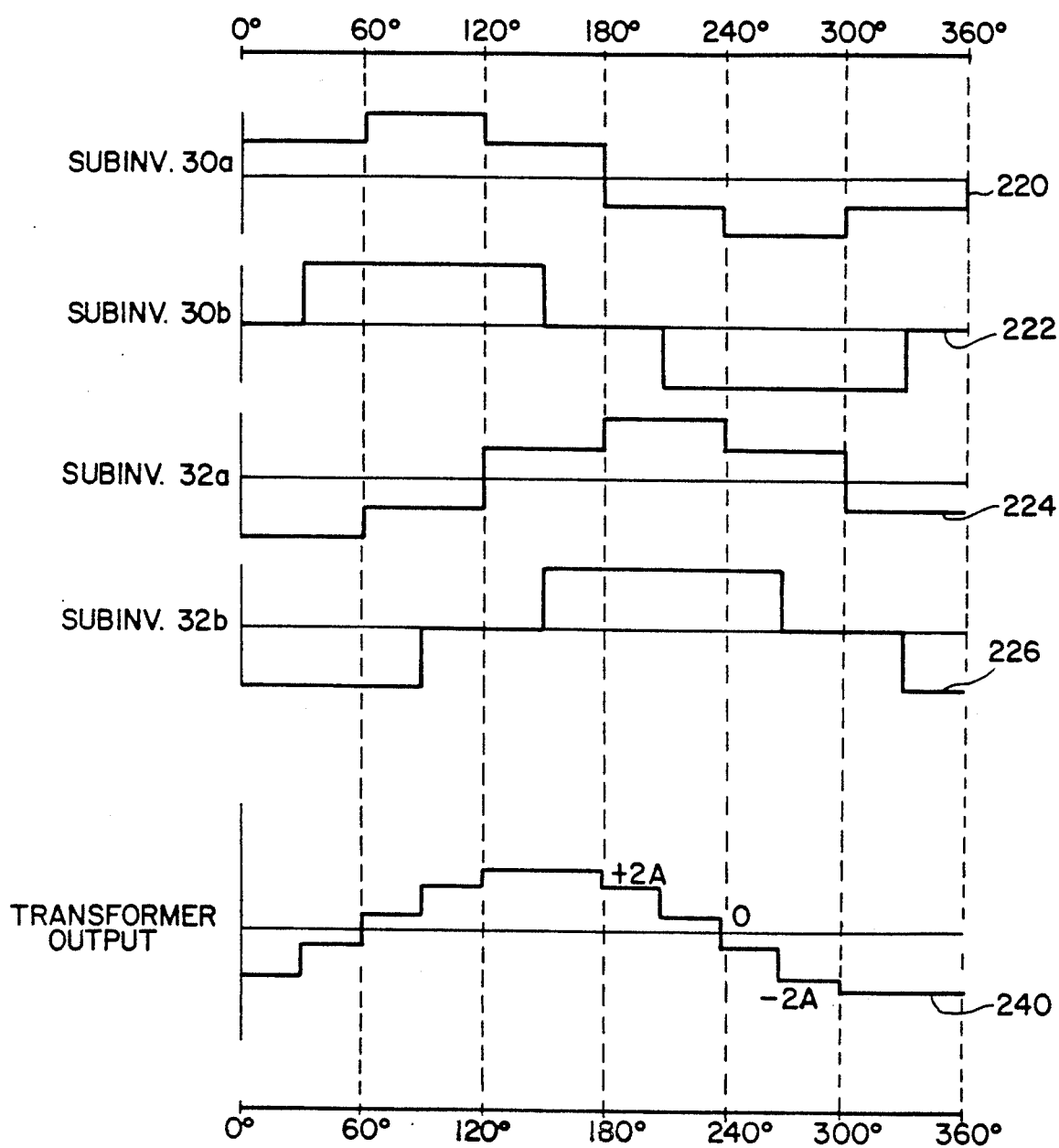
FIG. 6 illustrates a second phase relationship of a number of waveforms generated by the inverter and a waveform produced by the summation of those waveforms.
Figure 7:
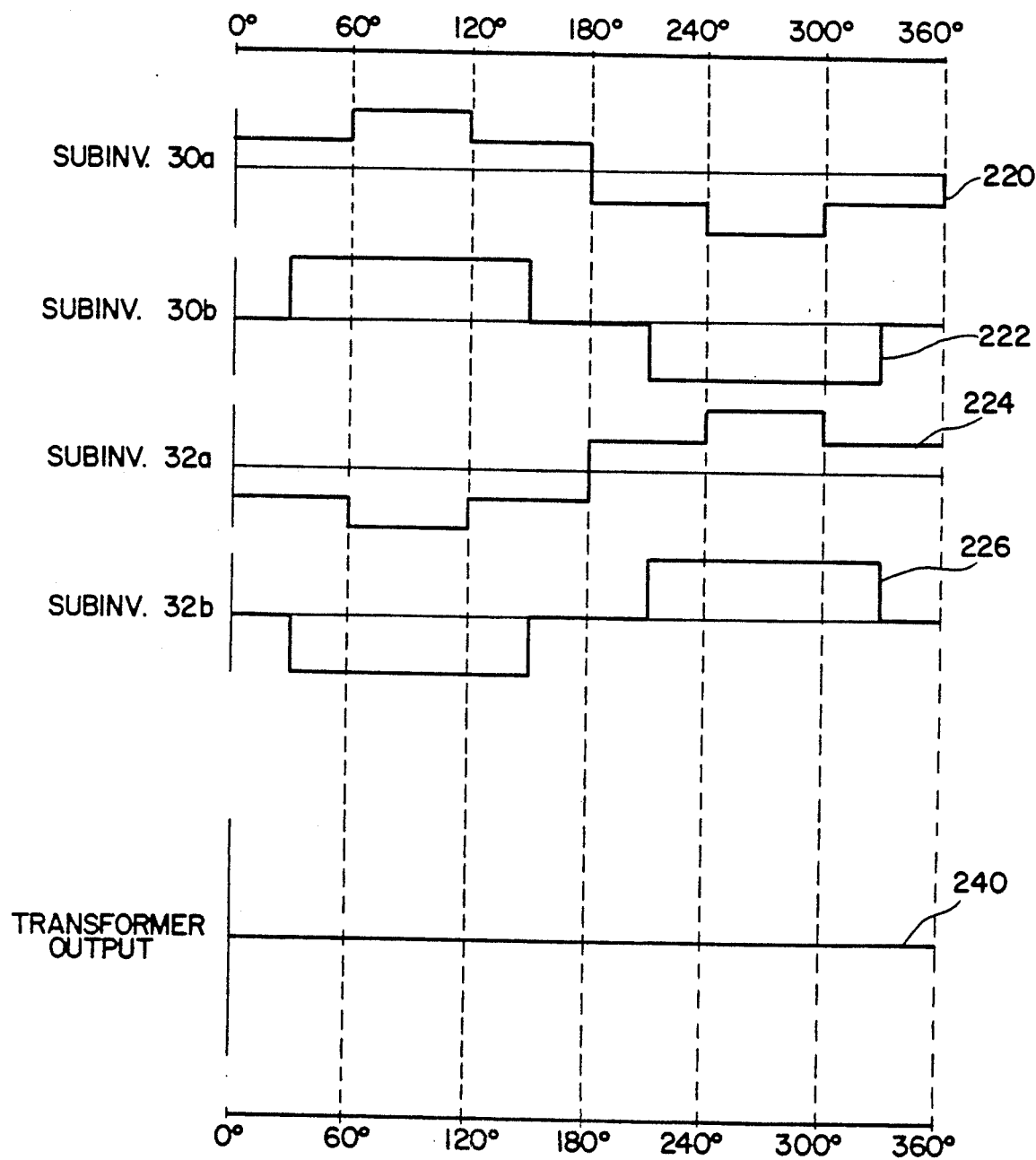
FIG. 7 illustrates a third phase relationship of a number of waveforms generated by the inverter and a waveform produced by the summation of those waveforms.

FIGS. 5–7 illustrate the various phase relationships of the subinverter waveforms during operation of the inverter. In FIGS. 5–7, the phase angle between the first subinverter pair waveforms 220, 222 and the second subinverter pair waveforms 224, 226 is variable. This variable phase angle is shown to be 15° in FIG. 5, 120° in FIG. 6, and 180° in FIG. 7.

By controlling the phase angle between the first and second subinverter pair waveforms, the resultant output voltage may be regulated. For example, the output voltage waveform 240 has a maximum positive amplitude of +4A and a maximum negative amplitude of −4A in FIG. 5, a maximum positive amplitude of +2A and a maximum negative amplitude of −2A in FIG. 6, and a zero amplitude in FIG. 7.

Figure 8A:
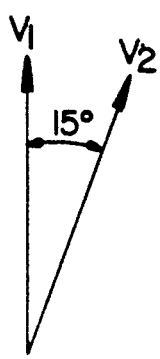
FIGS. 8a-8c are vector diagrams illustrating the operation of the inverter of the invention.
Figure 8B:
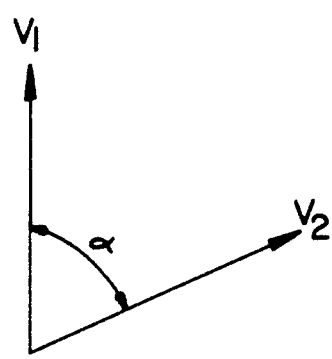
Figure 8C:
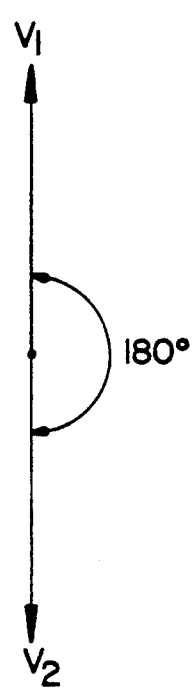

Referring to FIGS. 8a–8c, the vector diagrams in those figures illustrate the operation of the inverter 24. The vector $V_1$ represents the first subinverter pair waveforms 220, 222, and the vector $V_2$ represents the second subinverter pair waveforms 224, 226. The phase angle between $V_1$ and $V_2$ may vary from a minimum phase angle of approximately 15° as shown in FIG. 8a to a maximum phase angle of 180° as shown in FIG. 8c. In between the minimum and maximum phase angles, the phase angle may be any variable angle $\alpha$ as shown in FIG. 8b. The vector positions shown in FIGS. 8a and 8c represent the extreme phase angles, and during normal operation the phase angle will be as shown in FIG. 8b.

Figure 9:
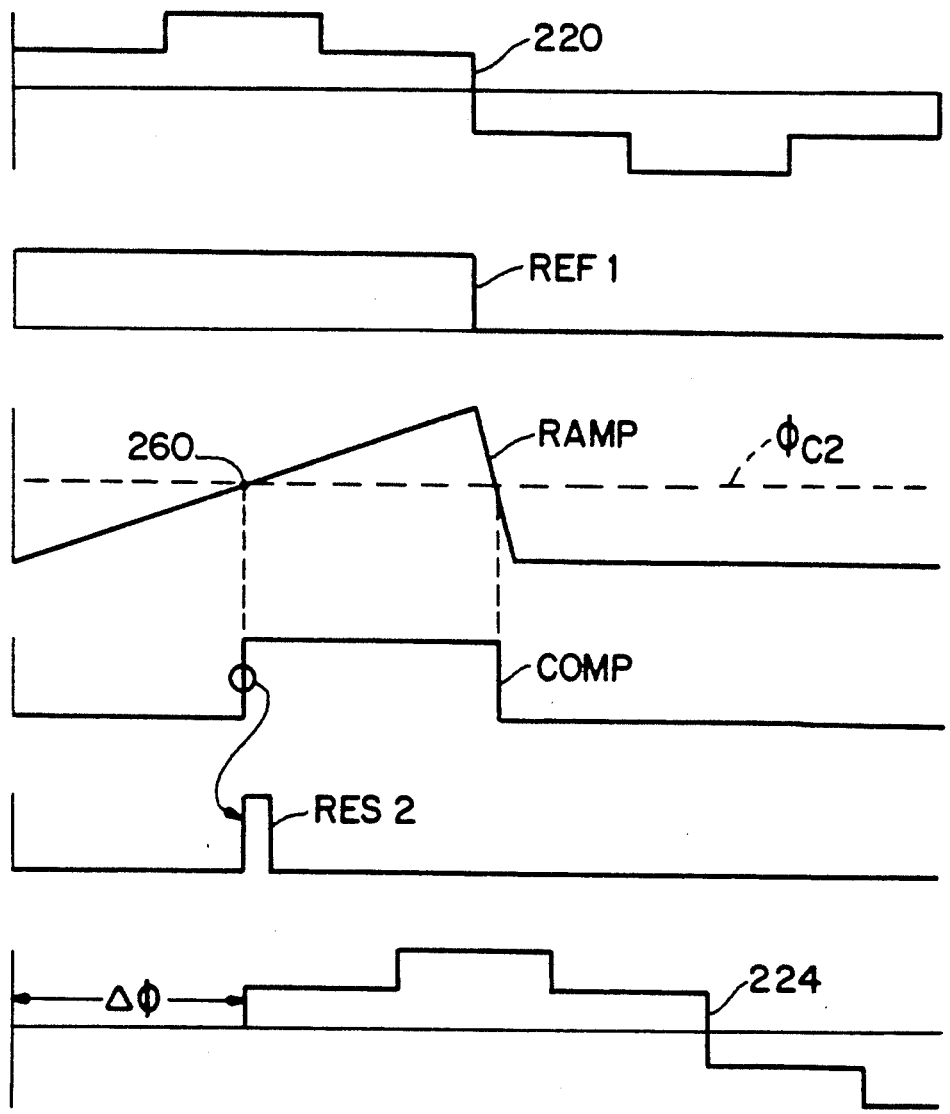
FIG. 9 illustrates various waveforms relating to the operation of the phase angle control circuit of FIG. 2.

One manner of controlling the phase angle is illustrated in FIG. 9, which illustrates the control of the phase angle between the subinverter 32a waveform 220 and the subinverter 34a waveform 224. Referring to FIG. 9, the waveform 220 is shown in its phase relationship with respect to REF1. As can be seen, REF1 changes from zero to positive when waveform 220 transitions to a positive amplitude and from positive to zero when waveform 220 transitions to a negative amplitude. A ramp signal, RAMP, is generated based upon the magnitude of the REF1 signal. When the REF1 signal is positive, the amplitude of the RAMP signal slowly increases. When the magnitude of the REF1 signal changes to zero, the magnitude of the RAMP signal quickly decreases to zero.

The RAMP signal is used to generate the RES2 signal based on a phase control signal $\Phi_{c2}$ generated from the phase control signal $\Phi_c$ of FIG. 2. The magnitude of the $\Phi_{c2}$ signal varies, depending upon the magnitude of the current and voltage sensed on the transformer output lines 28a, 28b, 28c. The relative values of the RAMP and $\Phi_{c2}$ signals are used to generate a comparison signal, COMP, having a positive amplitude when the value of the RAMP signal is greater than the value of the $\Phi_{c2}$ signal and a zero amplitude when the value of the RAMP signal is less than the value of the $\Phi_{c2}$ signal. The point of intersection of the rising portion of the RAMP signal and the $\Phi_{c2}$ signal determines the magnitude of the phase delay between the subinverter waveforms. This intersection point is shown as point 260 in FIG. 9.

At the intersection point 260, the COMP signal changes from zero to a positive amplitude. The rising edge of the COMP signal triggers the RES2 signal to become positive, or activated. When the RES2 signal is activated, it resets the counters 110, 112, 114 associated with the second subinverter pair 32. As a result, the counters produce a zero 10-bit address, and the EPROM 116 starts to generate the waveform 224. Thus, the time-occurrence of the rising edge of the RES2 signal controls the phase difference between the waveform 220 and the waveform 224. This phase difference is shown in FIG. 9 as $\Delta\Phi$.

It should be appreciated that the magnitude of the $\Phi_{c2}$ signal determines the magnitude of the phase delay $\Delta\Phi$. If the magnitude of $\Phi_{c2}$ is larger, the $\Phi_{c2}$ signal will intersect the RAMP signal later, thus causing a larger phase delay. If the magnitude of $\Phi_{c2}$ is smaller, the $\Phi_{c2}$ signal will intersect the RAMP signal earlier, thus causing a smaller phase delay.

Figure 10:
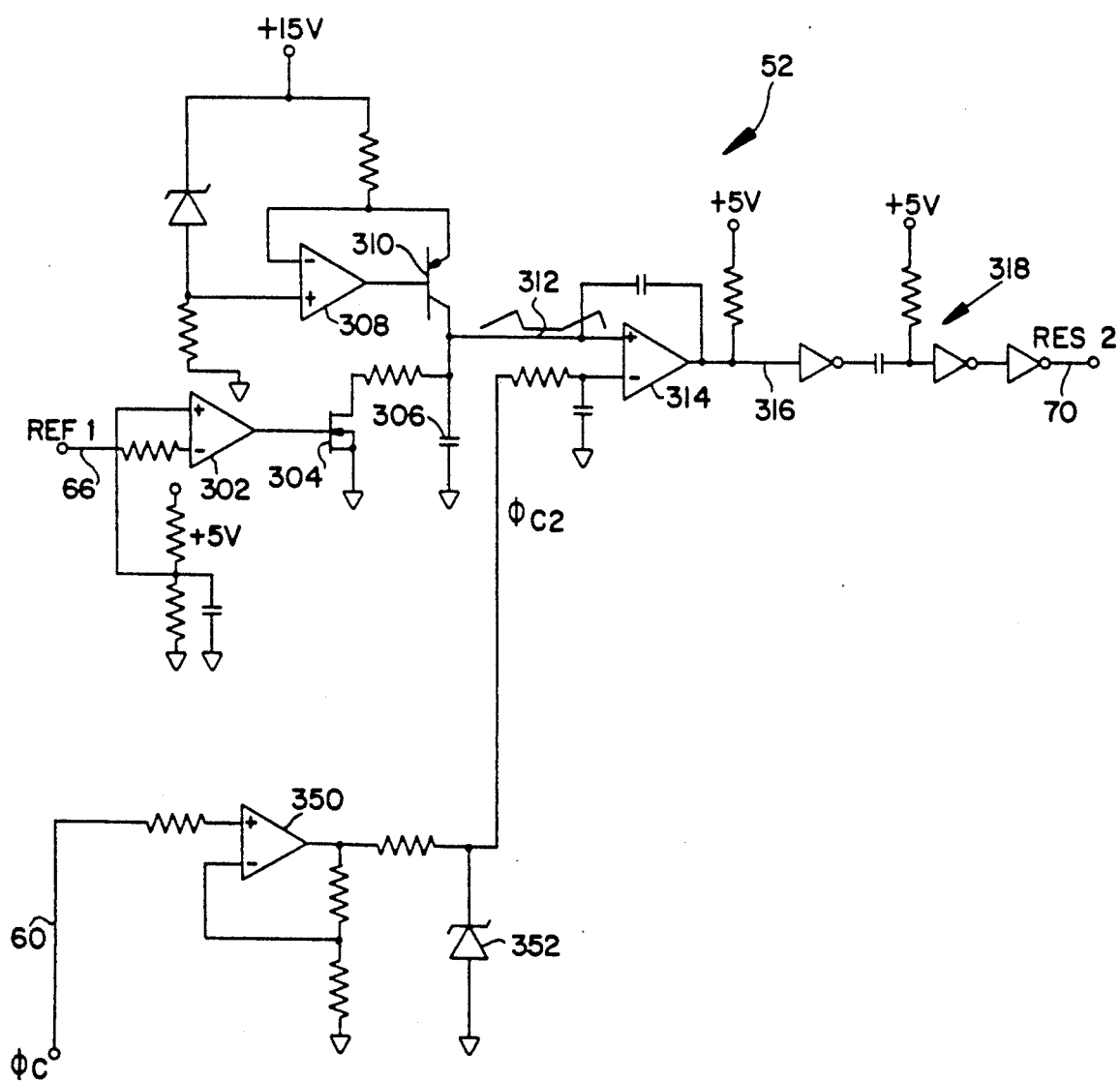
FIG. 10 is a circuit diagram of the phase angle control circuit shown schematically in FIG. 2.

One phase angle control circuit 52 for accomplishing the manner of determining the phase angle between the subinverter pairs 30, 32 is shown in FIG. 10. The REF1 and $\Phi_c$ signals are input to the phase angle control circuit 52 via the lines 66, 60, respectively, and the circuit 52 generates the RES2 signal on the line 70. Referring to FIG. 10, the circuit 52 includes a ramp generator comprising a comparator 302 having an inverting input which receives the REF1 signal and a noninverting input that receives a predetermined reference voltage. The ramp generator also includes a transistor 304, a capacitor 306, and a constant current source comprising an operational amplifier 308 and a transistor 310.

The capacitor 306 is slowly charged by the constant current source via the transistor 310 when the transistor 304 is nonconducting and is quickly discharged through the transistor 304 when the transistor 304 becomes conductive. The transistor 304 conducts when the value of the REF1 signal is less than the predetermined voltage provided at the noninverting input of the comparator 302. As a result, a ramp signal is produced on the line 312.

The ramp signal is input to the noninverting input of a comparator 314 via the line 312. The inverting input of the comparator 314 is supplied with the $\Phi_{c2}$ signal having a magnitude based upon the $\Phi_c$ signal. The comparator 314 generates on a line 316 a comparison signal having a high output when the value of the ramp signal is greater than $\Phi_{c2}$ and a low output when the value of the ramp signal is less than the value of $\Phi_{c2}$. The comparison signal on line 316 is provided to a monostable multivibrator, or one-shot 318 comprising three inverters and a capacitor. The output of the one-shot 318 is the RES2 signal, which determines the phase angle between the waveforms of the first subinverter pair 30 and the waveforms of the second subinverter pair 32.

The magnitude of the $\Phi_{c2}$ signal is determined by a portion of the phase angle control circuit 52 shown in the bottom of FIG. 10, based upon the magnitude of the $\Phi_c$ signal. The $\Phi_{c2}$ signal is generated by an operational amplifier 350 that acts as a voltage follower. Thus, the output of the amplifier 350 follows the magnitude of the $\Phi_c$ signal. A zener diode 352 is connected to the output of the amplifier 350 and acts to limit the magnitude of the $\Phi_{c2}$ signal to a maximum predetermined value. This predetermined value is the voltage that causes the maximum phase angle of 180° between the waveforms of the first subinverter pair and the waveforms of the second subinverter pair.

Figure 11:
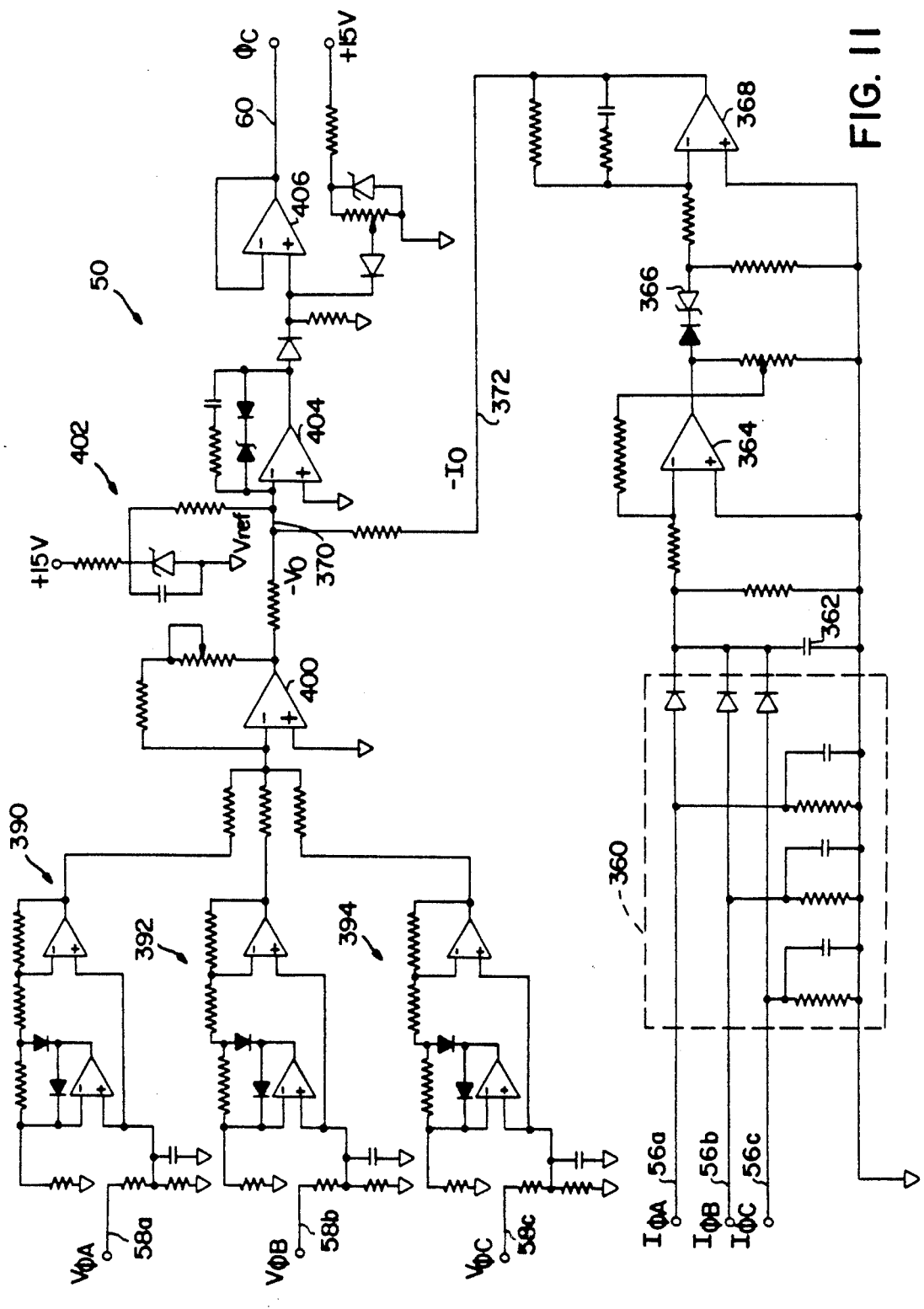
FIG. 11 is a circuit diagram of the output sensing circuit shown schematically in FIG. 2.

The $\Phi_c$ signal is generated by the output sensing circuit 50 based upon the current and voltage sensed on the transformer output lines 28a-c. The output sensing circuit 50 is shown in detail in FIG. 11. Referring to FIG. 11, the output sensing circuit 50 includes a first portion shown at the bottom of FIG. 11 that generates a voltage based on the amount of current sensed in the lines 56a, 56b, 56c. The three phases of output current, $I_{\Phi A}$, $I_{\Phi B}$, $I_{\Phi C}$, on the lines 56a, 56b, 56c, respectively, are rectified by a half-wave rectifier circuit 360. The output of the half-wave rectifier circuit 360 is filtered by a smoothing capacitor 362 and then provided to the inverting input of a operational amplifier 364 used for scaling purposes. The output of the operational amplifier 364 is passed through a zener diode 366 which is coupled to the inverting input of an operational amplifier 368 that acts as an inverter. The operational amplifier 368 generates a negative voltage, $-I_o$, that is zero if the amount of current sensed in the lines 56a, 56b, 56c is not above a predetermined threshold. The current threshold corresponds to twice the rated current for the power conversion system 10. If the current sensed is above the threshold, then the magnitude of $-I_o$ is proportional to the amount of current over the threshold, or overcurrent. The $-I_o$ signal is transmitted to a summing point 370 via a line 372.

The upper portion of the output sensing circuit 50 comprises three precision full-wave rectifiers 390, 392, 394 coupled to receive the phase voltages, $V_{\Phi A}$, $V_{\Phi B}$, $V_{\Phi C}$ on the lines 58a, 58b, 58c, respectively. The rectified phase voltages are summed at the inverting input of an operational amplifier 400. The operational amplifier 400 generates a negative voltage at its output, $-V_o$, which has a magnitude that is proportional to the average output voltage sensed on the lines 58a, 58b, 58c. The $-V_o$ signal is transmitted to the summing point 370.

The summing point 370 is also connected to a circuit 402 that generates a predetermined reference voltage, $V_{ref}$. The $V_{ref}$ voltage represents the desired voltage at which the transformer output lines 28a-c should be kept. At the summing point 370, the $V_{ref}$, $-V_o$, and $-I_o$ signals are summed to produce an error signal, $V_{err}$, which equals $V_{ref} - I_o - V_o$. In normal operation, when the magnitude of the summing transformer output current is below the predetermined current threshold, the value of $-I_o$ will be zero, and the error signal will equal $V_{ref} - V_o$. However, if the output current exceeds the threshold, then $I_o$ will be a nonzero value, and it will effectively reduce the magnitude of the predetermined voltage, $V_{ref}$. If the overcurrent is large enough, the magnitude of $I_o$ will become as large as $V_{ref}$, and the effective reference voltage, $V_{ref} - I_o$, will become zero. As a result, the actual voltage $V_o$ will be reduced to zero. The amount of sensed current necessary to reduce the effective reference voltage to zero is three times the rated current for the system 10. Thus, when the current reaches three times the rated current, the output voltage on the lines 28a-c drops to zero.

The summed error voltage at the summing point 370 is input to the inverting input of an operational amplifier 404 which integrates the error. The amplifier 404 is coupled to an operational amplifier 406 that acts as a buffer and which produces the $\Phi_c$ signal, which ultimately determines the phase relationships of the waveforms generated by the subinverter pairs 30, 32.

Figure 12:
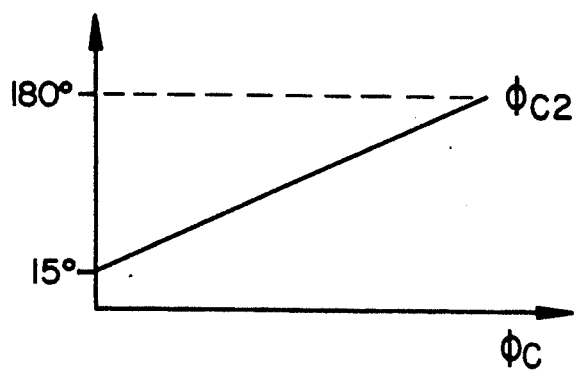
FIG. 12 is a graph of a voltage signal used in the phase angle control circuit to control the phase relationship of the waveforms generated by the inverter.

Referring to FIG. 12, the magnitude of the phase control signal $\Phi_{c2}$ with respect to the magnitude of the $\Phi_c$ signal during operation of the inverter is shown. The $\Phi_{c2}$ signal has a minimum value that produces the minimum phase angle of 15° between the waveforms of the first subinverter pair 30 and the waveforms of the second subinverter pair 32. The $\Phi_{c2}$ signal has a maximum value that produces the maximum phase angle of 180°.

While the minimum phase angle between the waveforms of the first and second subinverter pairs 30, 32 has been shown to be 15°, another minimum phase angle could be used, such as 10°.

Modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A power conversion system for an aircraft that produces an AC output having a current and voltage, comprising:
   a prime mover;
   a generator coupled to said prime mover for generating variable-frequency AC power;
   an AC/DC converter coupled to said generator for converting said variable-frequency AC power into DC power;
   a summing transformer;
   first and second subinverters coupled to said summing transformer that generate first and second waveforms in said summing transformer, said first and second waveforms having a variable phase angle between them, each of said first and second subinverters being coupled to said AC/DC converter; and
   a regulator circuit coupled to sense the current and voltage of the AC output, said regulator circuit varying said phase angle based upon both the magnitude of the voltage sensed at the AC output and the current sensed at the AC output.

2. A power conversion system for an aircraft that produces an AC output having a current and voltage, comprising:
   a prime mover;
   a generator coupled to said prime mover for generating variable-frequency AC power;
   an AC/DC converter coupled to said generator for converting said variable-frequency AC power into DC power;
   a summing transformer including first and second transformers;
   first and second subinverters that generate first and second waveforms in said first and second transformers, said first and second waveforms having a variable phase angle between them, each of said first and second subinverters being coupled to said AC/DC converter; and
   a regulator circuit coupled to sense the current and voltage of the AC output, said regulator circuit varying said phase angle based upon both the magnitude of the voltage sensed at the AC output and the current sensed at the AC output.

3. A power conversion system as defined in claim 2 wherein said phase angle is variable within a range having a lower limit of approximately 15° and an upper limit of 180°.

4. A power conversion system as defined in claim 2 wherein the AC output is the output of said summing transformer.

5. A power conversion system for an aircraft that produces an AC output having a current and voltage, comprising:
   a prime mover;
   a generator coupled to said prime mover for generating variable-frequency AC power;
   an AC/DC converter coupled to said generator for converting said variable-frequency AC power into DC power;
   a summing transformer including first and second transformers;
   first and second subinverters coupled to said AC/DC converter that generate first and second waveforms in said first and second transformers, said first and second waveforms having a variable phase angle between them; and
   a regulator circuit coupled to sense the current and voltage of the AC output, said regulator circuit varying said phase angle based upon both the magnitude of the voltage sensed at the AC output and the current sensed at the AC output,
     said regulator controlling the voltage at the AC output to a first predetermined magnitude when the current sensed at the AC output is less than a second predetermined magnitude,
     said regulator controlling the voltage at the AC output to less than said first predetermined magnitude when the current sensed at the AC output is more than said second predetermined magnitude.

6. A power conversion system for an aircraft that produces an AC output having a current and voltage, comprising:
   a prime mover;
   a generator coupled to said prime mover for generating variable-frequency AC power;
   an AC/DC converter coupled to said generator for converting said variable-frequency AC power into DC power;
   a summing transformer including first, second, third and fourth transformers;
   first, second, third and fourth subinverters coupled to said AC/DC converter that generate first, second, third and fourth sets of waveforms in said first, second, third and fourth transformers, said first and second sets of waveforms having a first fixed phase angle between them, said third and fourth sets of waveforms having a second fixed phase angle between them, said first and third sets of waveforms having a variable phase angle between them; and
   a regulator circuit coupled to sense the current and voltage of the AC output, said regulator circuit varying said variable phase angle based upon both the magnitude of the voltage sensed at the AC output and the current sensed at the AC output,
     said regulator controlling the voltage at the AC output to a first predetermined magnitude when the current sensed at the AC output is less than a second predetermined magnitude,
     said regulator controlling the voltage at the AC output to less than said first predetermined magnitude when the current sensed at the AC output is more than said second predetermined magnitude.

* * * * *